United States Patent
Maehara et al.

Patent Number: 6,137,247
Date of Patent: Oct. 24, 2000

[54] ELECTRIC POWER GENERATION CONTROL FOR VEHICLES USING A PLURALITY OF CONTROL SIGNALS

[75] Inventors: Fuyuki Maehara, Kariya; Hirohide Satoh, Toyokawa, both of Japan

[73] Assignee: DENSO Corporation, Kariya, Japan

[21] Appl. No.: 09/206,383

[22] Filed: Dec. 7, 1998

[30] Foreign Application Priority Data

Dec. 8, 1997 [JP] Japan ................................ 9-337221

[51] Int. Cl.⁷ ...................................................... H02J 7/04
[52] U.S. Cl. ........................................... 318/140; 318/434
[58] Field of Search ........................... 318/434, 139–140; 361/23, 30, 31

[56] References Cited

U.S. PATENT DOCUMENTS 5,521,486  5/1996  Takamoto et al. .
5,752,209  5/1998  Nishimoto et al. ........................ 701/41
5,767,636  6/1998  Kanazawa et al. .

FOREIGN PATENT DOCUMENTS 5-268733  10/1993  Japan .
6-261464  9/1994  Japan .
6-350456  12/1994  Japan .
8-179981  7/1996  Japan .
8-265308  10/1996  Japan .
8-308238  11/1996  Japan .

*Primary Examiner*—Paul Ip
*Assistant Examiner*—Marlon Fletcher
*Attorney, Agent, or Firm*—Pillsbury Madison & Sutro LLP

[57] ABSTRACT

A regulator for a vehicle-mounted alternator is connected to a vehicle-mounted engine control unit through a single signal line. The engine control unit produces serially a plurality of control signals in the form of pulse signals. The regulator includes an external signal receiver circuit, which detects periods of the control signals and duty ratios of the control signals. Control variables of the alternator such as a target voltage and gradual excitation period are determined by the detected periods. Control values of the control variables are determined by the detected duty ratios, respectively. The regulator thus controls a switching device, which supplies excitation current to the alternator based on the determined control variables and the control values.

20 Claims, 8 Drawing Sheets

ELECTRIC POWER GENERATION CONTROL FOR VEHICLES USING A PLURALITY OF CONTROL SIGNALS

CROSS REFERENCE TO RELATED APPLICATION

This application relates to and incorporates herein by reference Japanese Patent Application No. 9-337221 filed on Dec. 8, 1997.

BACKGROUND OF THE INVENTION

1. Field of the Invention

The present invention relates to an electric power generation control for an alternator of a vehicle.

2. Related Art

An electric power generation control apparatus is used to control power generation of an alternator of a vehicle, which charges a vehicle-mounted battery and supplies electric power to various vehicle-mounted electric devices. The control apparatus is recently designed to optimize the power generation operation of the alternator in response to changes in operating conditions of the vehicle.

In JP-A-5-268733, power generation of the alternator is controlled by a PWM signal received from an engine control unit.

In JP-A-8-275407, power generation of the alternator is controlled in response to vehicle condition signals received from an engine control unit. The vehicle condition signals are transmitted serially through a signal line. In a serial communication, the signals transmitted are susceptible to noise and data transmission speed is limited. Therefore, integrated circuits are necessitated in both power generation control apparatus and engine control apparatus separately.

In JP-A-7-184330, not only power generation of the alternator is controlled by a control signal received from an engine control unit, but also produces a diagnosis result when an output mode signal is received through the same signal line. However, a more complicated power generation control is not enabled in the case that a plurality of control signals are received from the engine control unit.

In JP-A-6-261464, power generation of the alternator is controlled by signal transmitting and receiving operations with an engine control unit.

SUMMARY OF THE INVENTION

It is therefore an object of the present invention to provide an electric power generation control for vehicles, which is capable of transmitting and receiving a plurality of control signals for a more advanced and complicated control.

It is another object of the present invention to provide an electric power generation control for vehicles, which is capable of obviating uncontrollable condition caused by non-receiving of control signals or by noise.

According to the present invention, a regulator for a vehicle-mounted alternator is connected to a vehicle-mounted engine control unit through a single signal line. The engine control unit produces serially a plurality of control signals in the form of pulse signals, which are transmitted to the regulator through the signal line. The regulator includes an external signal receiver circuit, which detects periods of the control signals and duty ratios of the control signals. Control variables of the alternator such as a target voltage and gradual excitation period are determined by the detected periods. Control values of the control variables are determined by the detected duty ratios, respectively. The regulator thus controls a switching device which supplies excitation current to the alternator based on the determined control variables and the control values.

Preferably, the control values are set to fixed default values when the external signal receiver circuit receives no control signals from the engine control unit.

BRIEF DESCRIPTION OF THE DRAWINGS

Other objects, features and advantages of the present invention will become more apparent from the following detailed description made with reference to the accompanying drawings. In the drawings.

DETAILED DESCRIPTION OF THE PREFERRED EMBODIMENT (First Embodiment)

Figure 1:
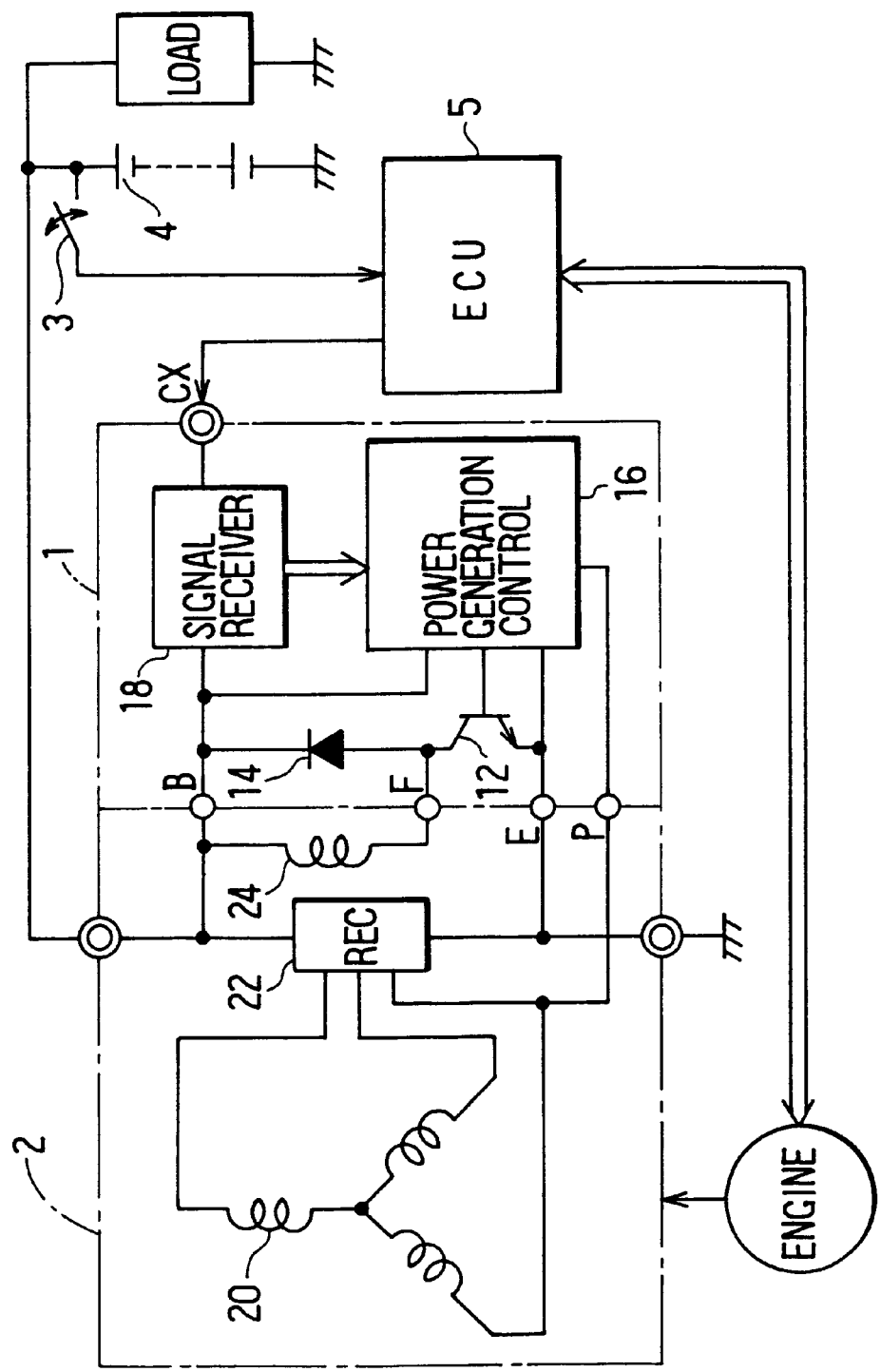
FIG. 1 is block diagram showing an electric power generation control apparatus according to a first embodiment of the present invention.

Referring first to FIG. 1 showing a first embodiment, an electric power generation control apparatus (regulator) 1 is designed to regulate the output voltage (generated voltage) of a vehicle-mounted alternator 2 to a fixed voltage (e.g., 14.5 volts). When a key switch 3 is turned on to connect a vehicle-mounted battery 4 to an electronic control circuit (ECU) 5 such as an engine control ECU, the ECU 5 produces various control signals so that the regulator 1 controls the power generation of the alternator 2 in response to those control signals transmitted from the ECU through a single signal line including a terminal CX.

The alternator 2 comprises three-phase stator coils 20 wound on a stator (not shown), a rectifier 22 for full-wave rectifying the three-phase output voltages of the stator coils 20, and a rotor coil (field coil) 24 wound on a rotor (not shown). The output voltage of the alternator 2 is controlled by turning on and off electric power supply (excitation current) to the rotor coil 24 by the regulator 1.

The regulator 1 comprises a switching transistor 12 connected in series with the rotor coil 24 to turn on and off the electric power supply, a fly-wheel diode 14 connected in parallel with the rotor coil 24 to flow a fly-wheeling current therethrough, a power generation control circuit 16 for controlling turning on and off of the switching transistor 12, and an external signal receiver circuit 18 which sets control variables of the alternator 2 in response to corresponding control signals received from the ECU 5. The control variables may be a target voltage to be generated by the alternator 2, a gradual excitation period, an upper limit of a conduction ratio of the switching transistor 12 and the like.

Figure 2:
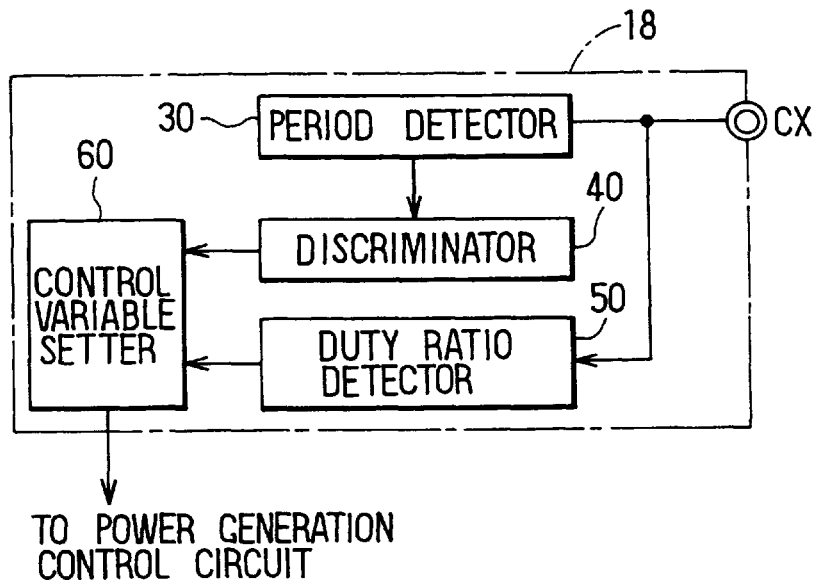
FIG. 2 is a circuit diagram of an external signal receiver circuit used in the first embodiment.

As shown in FIG. 2, the external signal receiver circuit 18 comprises a period detector 30 which detects signal periods of various control signals received from the ECU 5, a signal type discriminator 40 which discriminates types of signals based on the periods detected by the period detector 30, a duty ratio detector 50 which detects duty ratios of the received signals, and a control variable setter 60 which sets values of control variables corresponding to the discriminated types of the signals in response to the duty ratios detected by the duty ratio detector 50.

In this embodiment, the control signals produced from the ECU 5 includes at least a field coil conduction duty limit signal (Fduty limit signal) FL, a target voltage signal TV and a gradual excitation period signal GE. The Duty limit signal FL is for setting an upper limit of conduction (turn-on) ratio of the switching transistor 12, which turns on and off the electric power supply to the rotor coil 24, as one control variable. The target generated voltage signal is for setting a target value of the voltage, which is to be generated by the alternator 2 and detected at a terminal B shown in FIG. 1, as another control variable. The gradual excitation period signal GE is for setting an upper limit of a rate of increase in a conduction (turn-on) ratio of the switching transistor 12.

Figure 3:
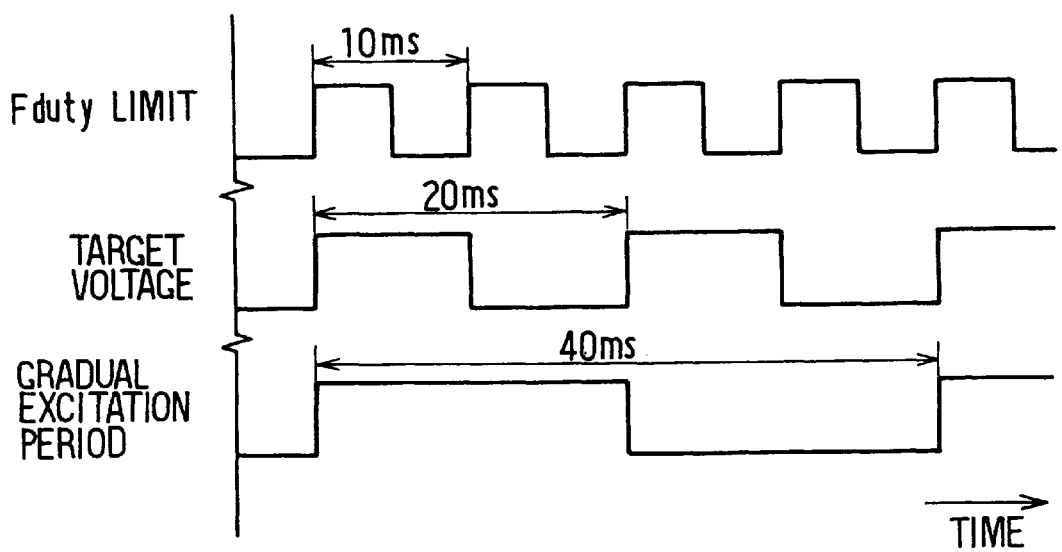
FIG. 3 is a timing diagram showing three control signals used in the first embodiment.

As shown in FIG. 3, the one-cycle periods of the Duty limit signal FL, target voltage TV and gradual excitation period signal GE are set to 10 ms, 20 ms and 40 ms, respectively. Although the signals are shown to have the 50% duty ratio in FIG. 3, the duty ratios are set variably with the control variables.

The period detector 30 shown in FIG. 2 detects the period of either one of the control signals (Duty limit signal FL, target voltage TV signal and gradual excitation period signal GE) applied to from the ECU 5. The signal type discriminator 40 discriminates the type of signals by checking whether the period detected by the period detector 30 is 10 ms, 20 ms or 40 ms.

Figure 4:
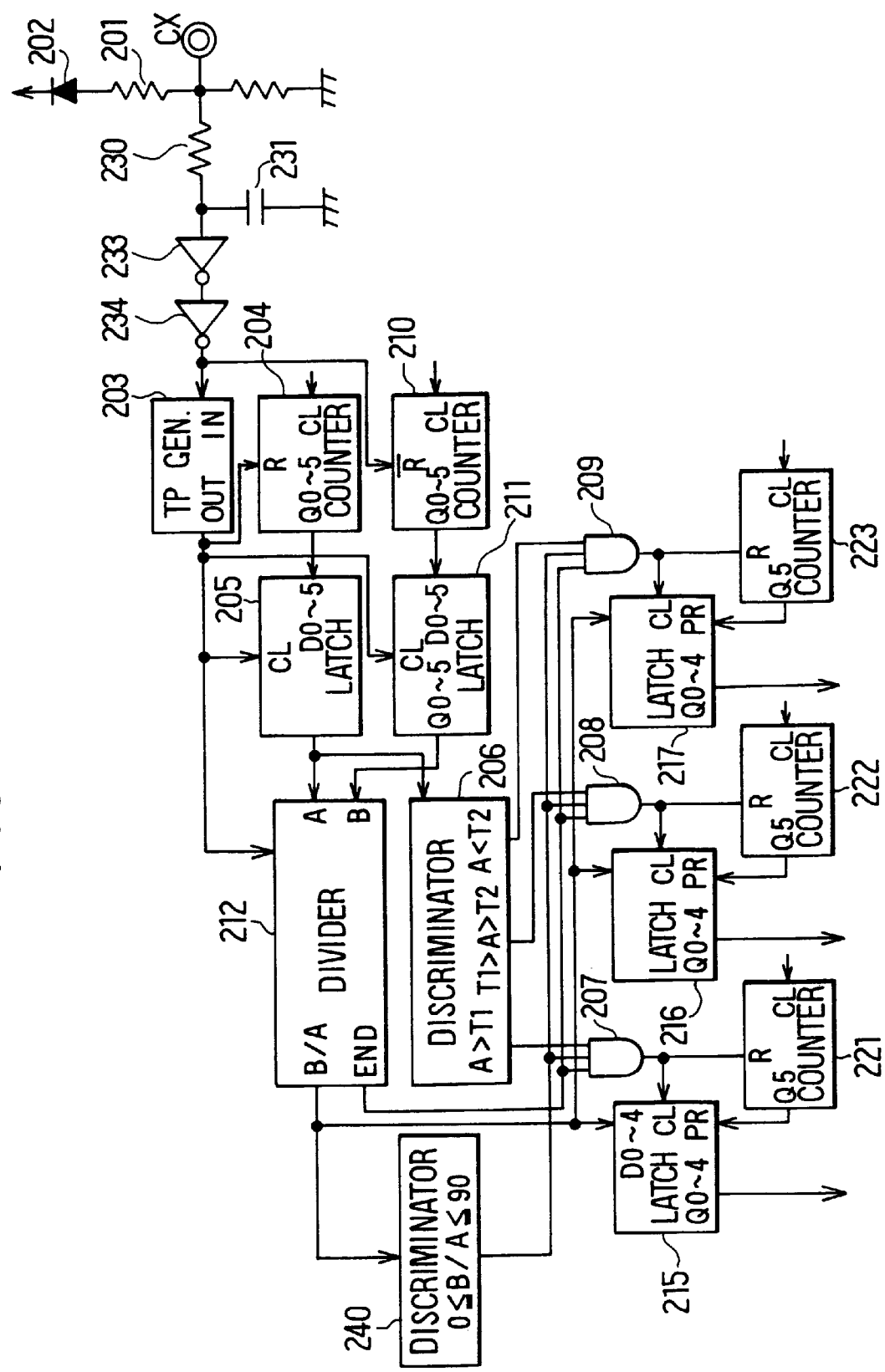
FIG. 4 is a detailed wiring diagram showing a circuit configuration of the external signal receiver circuit shown in FIG. 2.

The external signal receiver circuit 18 is constructed as shown in FIG. 4. That is, when the key switch 3 is turned on and the voltage at a terminal CX rises in response to the control signal from the ECU 5, a key-on signal is produced toward a power supply circuit from a series circuit comprising a resistor 201 connected to the terminal CX and a diode 202. As each of the control signals applied to from the ECU 5 to the regulator 1 is in a pulse width modulation (PWM) type which periodically changes its signal level between high and low, the key-on signal produced from the control signal also has the similar wave form.

Figure 5:
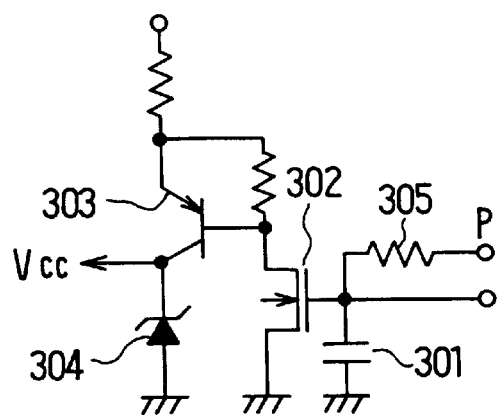
FIG. 5 is a detailed wiring diagram showing a circuit construction of a power supply circuit used in the first embodiment.

The power supply circuit is constructed as shown in FIG. 5. When the key-on signal is applied to, a capacitor 301 is charged to maintain a bias voltage applied to the gate of a MOS transistor 302 to be above a predetermined level. A transistor 303 connected to the drain of the MOS transistor 302 turns on. A zener diode 304 is turned on to supply a regulated constant voltage Vcc to each circuits. Thus, the power generation control circuit 16, external signal receiver circuit 18 and the like shown in FIG. 1 starts to operate. After the alternator 2 starts its power generation, a phase voltage of the stator coils 20 is applied to a terminal P and applied to the gate of the MOS transistor 302 through a resistor 305. As a result, even in the case that the control signal from the ECU 5 disappears, the power supply circuit is maintained to operate until the alternator 2 finally stop its power generation.

Referring back to FIG. 4, the external signal receiver circuit 18 comprises a trigger pulse (TP) generator 203, a period detection counter 204 and a period latch 205, which jointly operates as the period detector 30. The circuit 18 further comprises a signal discriminator 206 and a latch signal selector AND gates 207, 208, 209, which jointly operates as the signal type discriminator 40. The circuit 18 further comprises an on-period detection counter 210, an on-period latch 211 and a divider 212, which operates as the duty ratio detector 50. The circuit 18 still further comprises a gradual excitation period signal GE latch 215, a generated voltage signal latch 216, Duty limit signal FL latch 217, a gradual excitation period signal GE receiving interval detection counter 221, a generated voltage signal receiving interval detection counter 222 and a Duty limit signal FL receiving interval detection counter 223, which jointly operates as the control variable setter 60.

The PWM signal applied to from the ECU 5 to the terminal CX is subjected to noise filtration in a noise filtration circuit comprising a resistor 230 and a capacitor 231. The PWM signal is then subjected to wave form shaping in two inverters 233, 234, and finally applied to the trigger pulse generator 203 and the on-period detection counter 210.

The trigger pulse generator 203 generates a trigger pulse in synchronism with the rising of the PWM signal. The period detection counter 204, which receives this trigger pulse at its reset terminal R, counts an output interval of the trigger pulses, so that the period latch 205 latches the counted interval (period of the PWM signal). On the other hand, the on-period detection counter 210, which receives a wave form-shaped PWM signal at its inverted reset terminal, performs its counting operation only during the high level period of the PWM signal, so that the counted period (on-period) is latched by the on-period latch 211.

The divider 212 divides the value (on-period) B latched in the on-period latch 211 by the value (period) A latched in the period latch 205, so that the duty ratio of the applied to PWM signal is calculated. The divider 212 also produces an end signal as a trigger pulse from its terminal END each time the duty ratio calculation is completed.

The signal discriminator 206 selectively changes three types of output signals having different periods to a high level based on the value (period) A latched in the period latch 205. For instance, T1=30 ms and T2=15 ms are set as a threshold reference for selecting the period applied to from the period latch 205. If A>T1, that is, the PWM signal is the gradual excitation period signal GE having 40 ms period, a high level signal is produced to the AND gate 27. If T1>A>T2, that is, the PWM signal is the target voltage TV signal having 20 ms period, a high level signal is produced to the AND gate 208. Further, if T2>A, that is, the PWM signal is the Duty limit signal FL having 10 ms period, a high level signal is produced to the AND gate 209.

Thus, the high level signal is produced to either one of the AND gates 207, 208, 209 based on the period of the received PWM signal. When the divider circuit 212 produces the END signal, a latch signal is applied to only corresponding one of the latches 215, 216, 217 so that the output of the divider 211 indicative of the duty ratio is latched by either one of the latches 215, 216, 217. For instance, when the gradual excitation period signal GE is received, the AND gate 207 produces the latch signal so that the latch 215 latches the duty ratio of the gradual excitation period signal GE When the target voltage TV signal is received, the AND gate 208 produces the latch signal so that the latch 216 latches the duty ratio of the target voltage TV signal. When the Duty limit signal FL is received, the AND gate 209 produces the latch signal so that the latch 217 latches the duty ratio of the Duty limit signal FL. Thus, duty ratios of the signals latched by the latches 215, 216, 217 are produced to the power generation control circuit 16 shown in FIG. 1.

The duty ratio discriminator 240 produces a high level signal, when the duty ratio produced from the divider 212 is within a predetermined range. As the PWM signal having a too small duty ratio or too large duty ratio is more likely to be susceptible to noises, it is preferred to use the PWM signal which has the duty ratio within the above range. For this reason, when the duty ratio is in the range between 10% and 90%, for instance, the above latch signal output is validated by applying the high level signal from the duty ratio discriminator 240 to each AND gate 207, 208, 209.

The counters 221, 222, 223 provided in correspondence with the latches 215, 216, 217 apply the trigger pulse to preset terminals PR of corresponding latches 215, 216, 217, when no latch signal is produced from the corresponding AND gates 207, 208, 209. The latches 215, 216, 217, which receive the trigger pulses at the preset terminals PR, are preset so that predetermined default values are set. The default values corresponds to a gradual excitation period (that is, 5 seconds), a generated voltage (that is, 14.5 volts), and a Duty limit (that is, 100%), respectively.

Thus, one of latches 215, 216, 217 which should latch data is selected in response to the period of the PWM signal, so that the selected latch 215, 216, 217 latches the duty ratio calculated by the divider 212. As a result, the ECU 5 is enabled to apply to the regulator 1 a plurality of control signals which are capable of being set to arbitrary control values. This enables the regulator 1 to perform a more advanced power generation control.

Figure 6:
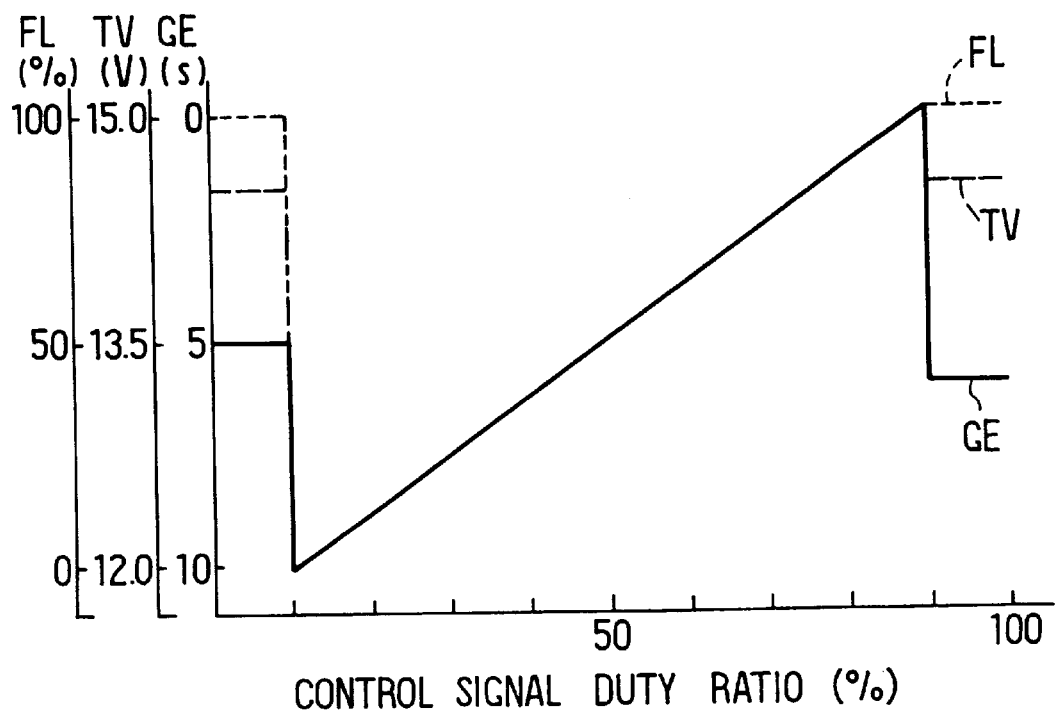
FIG. 6 is a graph showing a relation between duty ratios and set values of the control signals in the first embodiment.

As shown in FIG. 6, the duty ratio of the Duty limit signal FL may be set between 0% and 100% by setting the duty ratio of the Duty limit signal FL variably between 10% and 90%. Therefore, it becomes possible to set and change linearly the power generation suppression in dependence on engine temperatures and the like, when the power generation torque of the alternator 2 is required to be suppressed at the time of engine starting operation. Further, the target voltage TV may be set linearly between 12.0 volts and 15.0 volts by setting the duty ratio of the target voltage TV signal variably between 10% and 90%. As a result, it becomes possible to increase the power generation of the alternator 2 during a vehicle deceleration and to change the generated voltage in dependence on running conditions of the vehicle, so that the battery may be charged to the most condition.

Further, the gradual excitation period may be set between 10 seconds and 0 second by setting the duty ratio of the gradual excitation period signal GE variably between 10% and 90%. As a result, it becomes possible to cancel the gradual excitation control (gradual excitation period is set to 0) during vehicle running where no gradual excitation is necessary, so that a sufficient power generation is ensured. Further, it becomes possible to prevent engine stall by setting the gradual excitation period comparatively longer than normal.

Figure 7:
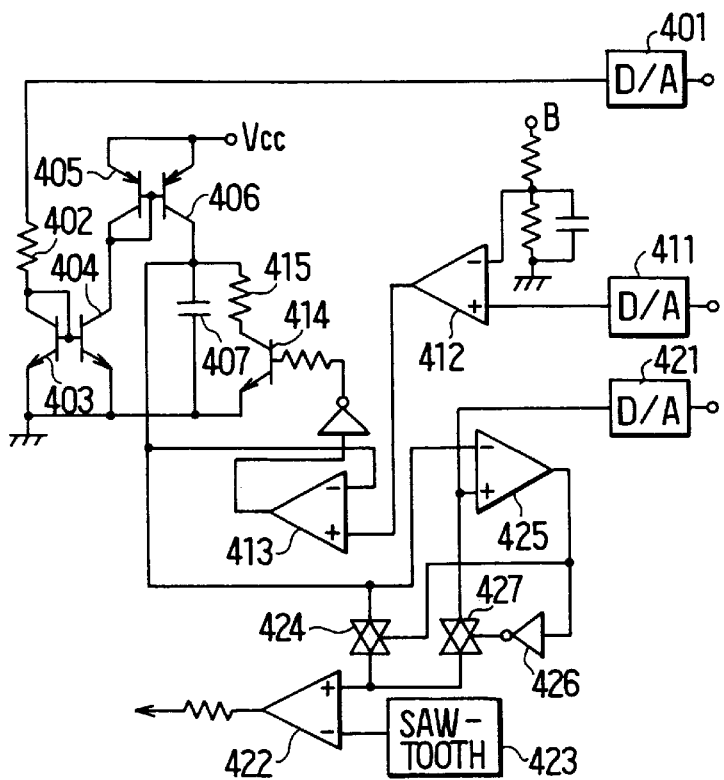
FIG. 7 is a detailed wiring diagram showing a circuit configuration of a power control circuit used in the first embodiment.

The power generation control circuit 16 is constructed as shown in FIG. 7.

In the circuit 16, a digital-analog converter 401 is provided to set the gradual excitation period. That is, the converter 401 converts the digital signal latched in the latch 215 (FIG. 4) into an analog signal. The output terminal of the converter 401 is connected to a current mirror circuit comprising transistors 403 and 404 through a resistor 402, which converts the output voltage of the converter 401 is converted into a current. The current decreases as the output voltage of the converter 401 decreases, that is, as the duty ratio of the gradual excitation period signal GE decreases for a longer gradual excitation period as shown in FIG. 6. On the contrary, the current increases as the output voltage of the converter 401 increases, that is, as the duty ratio of the gradual excitation period signal GE increases for a shorter gradual excitation period as shown in FIG. 6. The current mirror circuit of transistors 403 and 404 is connected to a gradual excitation capacitor 407 through another current mirror circuit comprising transistors 405 and 406, so that the charging current to the capacitor 407 is set in dependence on the output voltage of the converter 407. When the output voltage of the converter 401 is low, the charging current flowing into the capacitor 407 decreases. As a result, the charging period of the capacitor becomes longer. It takes more time to raise the conduction rate of the switching transistor 12 which is determined by the voltage of the capacitor 407. When the output voltage of the converter 401 is high, on the contrary, the charging current flowing into the capacitor 407 increases. As a result, the charging period of the capacitor becomes shorter. It takes less time to raise the conduction rate of the switching transistor 12.

A digital-analog converter 411 is provided to set the target voltage TV by converting the digital signal latched in the latch 216 (FIG. 4) into an analog signal. A differential amplifier 412 amplifies a differential voltage between the output voltage of the converter 411 and a divided voltage of a B-terminal voltage, so that a voltage comparator 413 compares the amplified differential voltage with the voltage of the capacitor 407. The comparator 413 produces a high level signal when the voltage of the capacitor 407 is lower than the amplified differential voltage, while it produces a low level signal when the voltage of the capacitor 407 is higher than the amplified differential voltage. The high level signal from the comparator 413 lowers the base potential of a transistor 414 to turn off the transistor 414, so that the capacitor 407 is charged by the charging current determined by the gradual excitation period signal GE. Therefore, when the target voltage TV is higher than the voltage generated actually by the alternator 2 at the B-terminal, the voltage of the capacitor 407 increases so that the actual voltage responsively increases. When the actual voltage of the alternator is higher than the target voltage TV, the transistor 414 turns on to discharge the capacitor 415 through a resistor 415. The voltage of the capacitor 407 thus decreases to lower the actual voltage of the alternator 2.

Further, a digital-analog converter 421 is provided to set the Duty limit FL by converting the digital signal latched in the latch 217 (FIG. 4) into an analog signal. A saw-tooth voltage of a saw-tooth generator 423 and the voltage of the capacitor 407, which passes through an analog switch 424, are applied to a voltage comparator 422. The comparator 422 thus produces to the switching transistor 12 the PWM signal having a duty ratio corresponding to the voltage of the capacitor 407. A voltage comparator 425 compares the voltage of the capacitor 407 and the output voltage of the converter 421. When the voltage of the capacitor 407 is lower than the other, that is, when a Duty corresponding to the voltage of the capacitor 407 is smaller than the Duty limit FL, the analog switch 424 turns on so that the PWM signal is produced based on the voltage of the capacitor 407. On the contrary, when the voltage of the capacitor 407 is higher than the other, that is, when the power generation of the alternator 2 is reduced by lowering the conduction rate of the switching transistor 12 by the Duty limit signal FL, an analog switch 426 connected to an inverter 426 turns on to apply the output voltage of the converter 421 is applied to the comparator 422 in place of the voltage of the capacitor 407. Thus, the PWM signal having the duty ratio corresponding to the Duty limit signal FL is produced to control the switching transistor 12.

Thus, according to this invention, it becomes possible to perform a complicated control by the use of a plurality of control signals, because the regulator 1 discriminates the type of control signals based on the periods thereof and sets the value of each control variable over a wide range. For instance, it is enable to control the power generation operation of the alternator 2 based on the conditions of the vehicle and the battery 4, so that a battery charging performance and engine fuel consumption may be improved. Further, even in the case that the control algorithm or control constants are to be changed in a control signal transmitting side such as the engine ECU 5, it is only necessary to change the relation between the duty ratios of the control signals and the control variables. This may be accomplished by simply modifying a control program (software).

Further, in the case that specifications of the ECU 5 change from vehicle to vehicle, it is only necessary to set the periods and the duty ratios of the control signals in the ECU 5. Therefore, the specification of the regulator 1 need not be changed from vehicle to vehicle. As the control signals are transmitted to the regulator in the form of PWM signal which is less susceptible to noise, the control signals may be transmitted and received at high speeds.

Still further, as the period and the duty ratio of each control signal may be changed by modifying the control program in the ECU 5 and the setting of the control variables need not be executed on real-time basis, processing load on the ECU 5 is not increased and other processing such as engine control processing in the ECU 5 is not influenced thereby. Thus, the regulator 1 may be widely used with various types of ECUs.

Figure 8:
FIG. 8 is a timing chart showing a desired wave form of the control signal applied to the control apparatus.

Preferably, the control signals are transmitted to the regulator in the form shown in FIG. 8. That is, the Duty limit signal FL, target voltage TG and gradual excitation period signal GE are transmitted serially within periods a, b and c, respectively. Each of those periods a, b and c are repeated at a predetermined repetition period. This repetition period is set to be shorter than the predetermined periods from resetting of the counters 221, 222, 223 in the external signal receiver circuit 18 to outputting trigger pulses therefrom. Therefore, as long as the control signals are applied periodically, the gradual excitation period, target voltage and Duty limit are set based on the duty ratios of the control signals. In the event that, periodic application of the control signals is interrupted, all or one of gradual excitation period, target voltage and Duty limit which corresponds to the interrupted control signals are set to the predetermined default value.

Thus, the control signals are applied periodically in the fixed order. Therefore, even in the case that the control values are set erroneously due to noise in the control signals, the control values are set to appropriate values in the next period. That is, influence of noise can be reduced to a minimum. Further, by setting the period required to output the default value in response to each erroneous control signal longer than the repetition period of the control signals, the Duty limit FL and the like can be set in response to the control signals applied normally, while those can be set to the default values in response to interruption of the control signals. Further, because presence and absence of the control signals can be checked on signals applied within the repetition period, no complicated logic circuit or the like is necessitated to check the presence and absence of the control signals.

(Second Embodiment)

Figure 9:
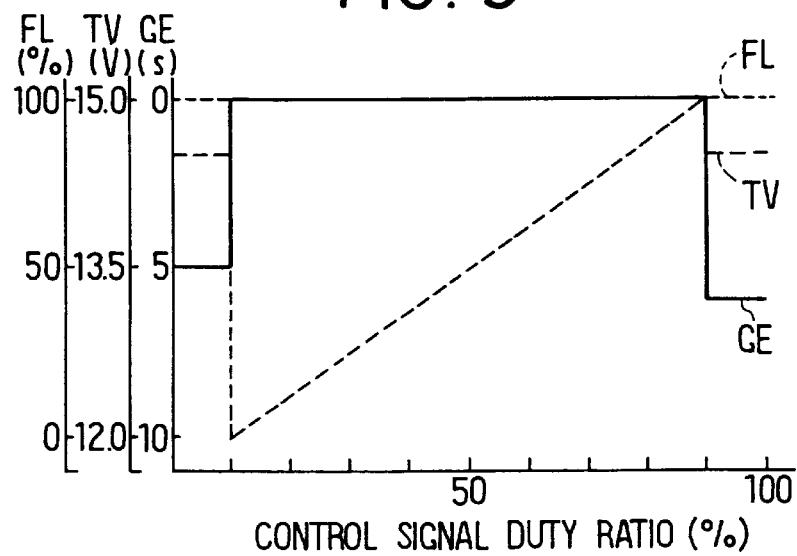
FIG. 9 is a graph showing a relation between duty ratios and set values of the control signals in a second embodiment of the present invention.

As a modification of the first embodiment in which the values of the control variables are set in correspondence with the duty ratios of the received control signals, respectively, some of the values may be set to a constant value alternatively irrespective of the duty ratios. For instance, as shown in FIG. 9, the gradual excitation period may be set to 0 second irrespective of the duty ratio when the gradual excitation period signal GE is duly received, while it may be set to the default value, about 5 seconds, when the gradual excitation period signal GE is not received. That is, the values of the control variable which should be varied continuously is set based on the duty ratios of the corresponding control signals, while the values of other control variables which need not be varied continuously may be set to fixed values (Third Embodiment)

In this embodiment, only two control signals, that is, Duty limit signal FL and the target voltage signal TV, are applied to the regulator 1. The power generation is controlled without gradual excitation period control. Because it is not necessary to set the gradual excitation period GE, the Duty limit value is set to a comparatively large value or canceled (set to 0) In the case that no control signal which corresponds to the Duty limit signal FL is received because of failure in the signal line or in the operation of ECU 5, the Duty limit is set to the default value (for instance, 100%) and the gradual excitation period is also set to the default value (for instance, 5 seconds).

Figure 10:
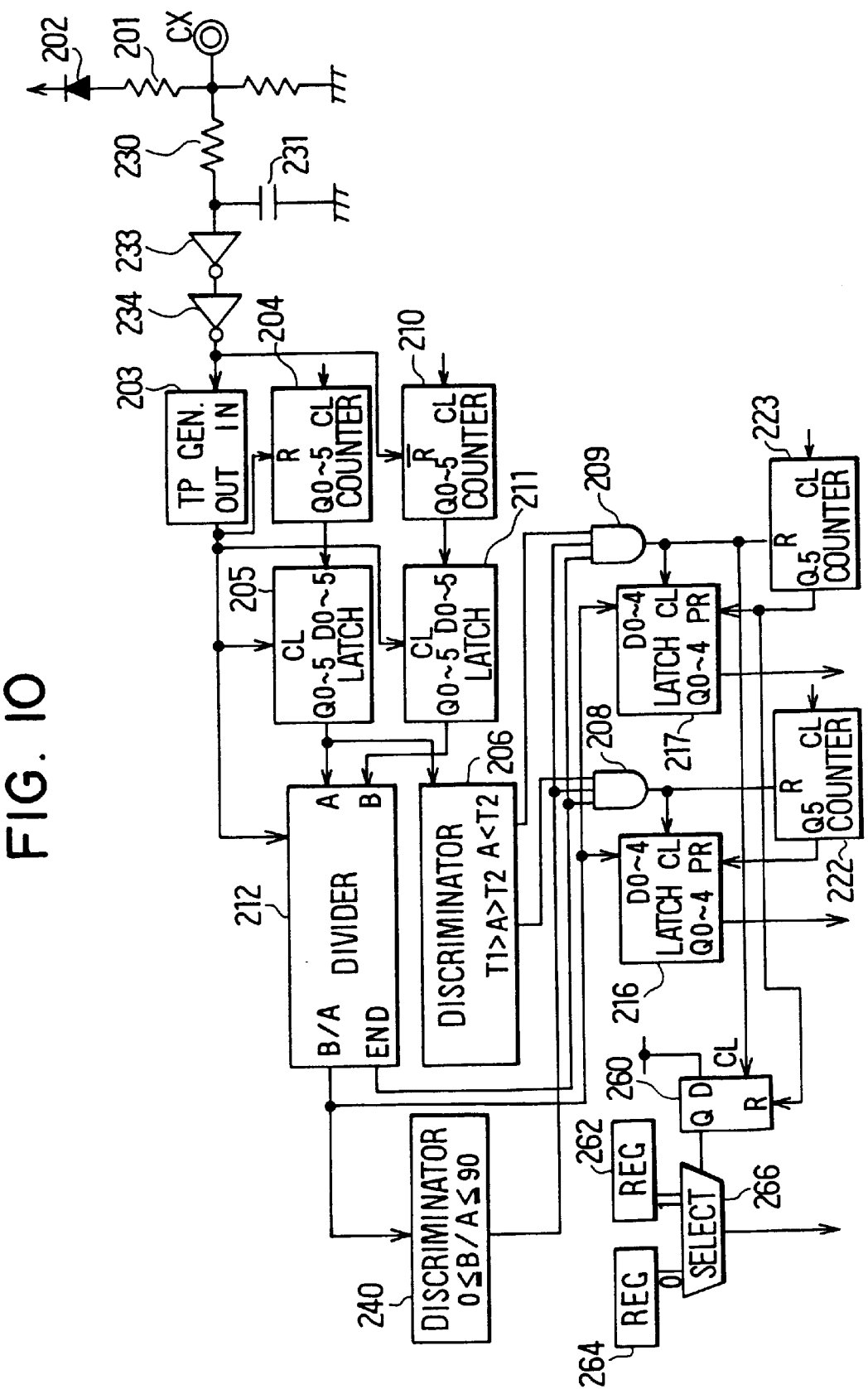
FIG. 10 is a detailed wiring diagram showing a circuit configuration of the external signal receiver circuit in a third embodiment of the present invention.

The external signal receiver circuit 18 in the regulator 1 in this embodiment is constructed as shown in FIG. 10. In this circuit 18, D-type flip-flop 260, registers 262, 264 and a selector 266 are used in place of the AND gate 207, latch 215 and counter 221 used for setting the gradual excitation period GE in the first embodiment (FIG. 4).

The D-type flip-flop 260 has a clock terminal CL connected to the AND gate 209, which is for setting the Duty limit, and a reset terminal R connected to the counter 223. Therefore, when the latch signal is produced from the AND gate 209 in response to the Duty limit signal FL, the flip-flop 260 latches the high level signal constantly applied to the input terminal D to produce the high level signal from its output terminal Q. As a trigger pulse is produced from the counter 223 when a predetermined period elapses under the condition that the Duty limit signal FL is not applied, the flip-flop 260 is reset and the signal produced from the output terminal Q is changed from high to low level.

The selector 266, receiving at its control terminal a signal produced from the flip-flop 260, selects the data applied to its input terminals 1 and 0 when the received signal is high and low, respectively. The register 262 and the register 264 are connected to the input terminals 1 and 2 of the selector 266, respectively.

The register 264 stores therein the default value of the gradual excitation period to be used when no Duty limit signal FL is received. The default value may corresponds to the gradual excitation period of 5 seconds. The register 262 stores therein the value of the gradual excitation period to be used when the Duty limit signal FL is received. This stored value corresponds to the gradual excitation period and is set to be larger than the default value stored in the register 264. The gradual excitation period to be set in response to the Duty limit signal FL is set to a period shorter than the period (for instance, 5 seconds) set based on the Duty limit signal FL. It is possible to disable or stop the gradual excitation control by storing in the register 262 which corresponds to the gradual excitation period, 0 second.

Figure 11:
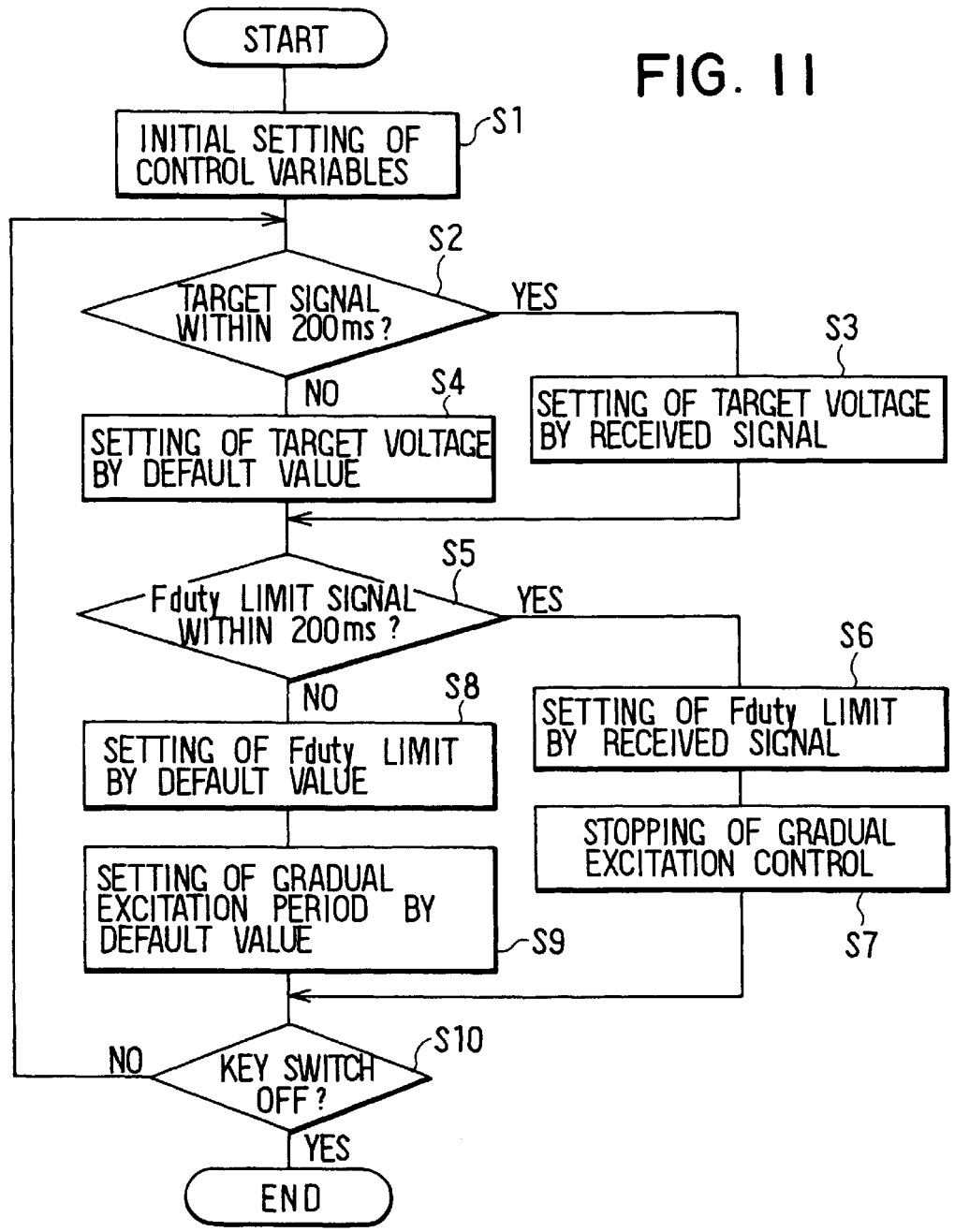
FIG. 11 is a flow diagram showing control processing executed by the external signal receiver circuit shown in FIG. 10.

The external signal receiver circuit 18 shown in FIG. 11 operates as shown in FIG. 11.

When the key switch 3 turns on and the receiver circuit 18 is rendered operative, the control variables, that is, Duty limit FL, target voltage TV and the gradual excitation period GE, are set initially to the default value at step S11. For instance, the Duty limit FL is set to 100% which corresponds to its default value by applying a power-on reset signal to the preset terminal PR of the latch 217. similarly, the target voltage TV is set to 14.5 volts which corresponds to its default value by applying the power-on reset signal to the preset terminal PR of the latch 216. Further, the default value stored in the register 264 is selected by the selector 266 by applying the power-on reset signal to the reset terminal R of the flip-flop 260, so that the gradual excitation period is set to 5 seconds which corresponds to the selected default value.

Figure 12:
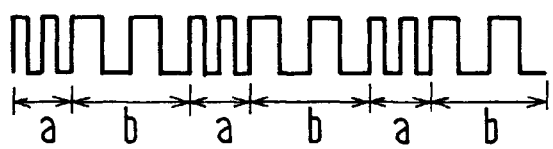
FIG. 12 is a timing chart showing a desired wave form of the control signal applied to the control apparatus.

Then, it is checked at step S2 whether the target voltage signal TV is received within a predetermined period (for instance, 200 ms). Here, the control signals are applied normally in the form shown in FIG. 12. The signal form includes repeatedly a signal period a which is for transmitting the Duty limit signal FL and a signal period b which is for transmitting the target voltage signal TV. The repetition period may be set to 200 ms. The predetermined periods used in step S2 or step S5 are set longer than the repetition period.

In the case where the target voltage signal TV is received from the ECU 5 within 200 ms, the duty ratio of the target voltage signal TV produced from the divider circuit 212 is latched by the latch 216 in synchronism with the latch signal produced from the AND gate 208. Thus, at step S3, the target voltage value is set based on the latched duty ratio. In the case where the target voltage signal TV is not received from the ECU 5 within 200 ms, the latch 216 is preset by the trigger pulse produced from the counter 222. Thus, at step S4, the target voltage value is set to the default value (for instance, 14.5 volts) produced from the latch 216.

Concurrently with the setting of the target voltage value, it is checked at step S5 whether the Duty limit signal FL is received within the predetermined period (for instance, 200 ms). In the case where the Duty limit signal FL is received from the ECU 5 within 200 ms, the duty ratio of the Duty limit signal FL produced from the divider circuit 212 is latched by the latch 217 in synchronism with the latch signal produced from the AND gate 209. Thus, at step S6, the Duty limit value is set based on the latched duty ratio. The output signal of the flip-flop 260 becomes high in synchronism with the latch signal produced from the AND gate 209. At step S7, the selector selects the gradual excitation value stored in the register 262 which corresponds to the longer gradual excitation period (0 second or the period longer than the default value stored in the register 264), so that the gradual excitation control is stopped.

In the case where the Duty limit signal FL is not received from the ECU 5 within 200 ms, on the contrary, the latch 217 is preset by the trigger pulse produced from the counter 223. Thus, at step S8, the Duty limit value is set by the use of the default value produced from the latch 217. Further, as the flip-flop 260 is reset by the flip-flop 260 by the trigger pulse produced from the counter 223, the selector 266 selects the default value (for instance, 5 seconds) stored in the register 264. Thus, at step S9, the gradual excitation period is set by the default value. The above sequence of steps S2 to S9 are repeated until the turn-off of the key switch 3 is detected at step S10.

As described above, as long as the Duty limit signal FL is received, it is possible to control the gradual excitation period by varying the Duty limit value. Thus, even when the gradual excitation period is set larger or the gradual excitation control is canceled by not setting any values, the engine is not subjected to receiving a load instantaneously. As a result, the engine is prevented from stalling due to rapid increase in the load on the engine at the time of engine idling operation. Further, even when the Duty limit signal FL is not received, the gradual excitation period is set based on the default value, the engine is prevented from being subjected to the rapid increase in the load applied to the engine due to the too short gradual excitation period. This is advantageous when the Duty limit signal FL is not received due to breakage of the signal line, operation failure of the ECU 5 and the like.

(Fourth Embodiment)

Figure 13:
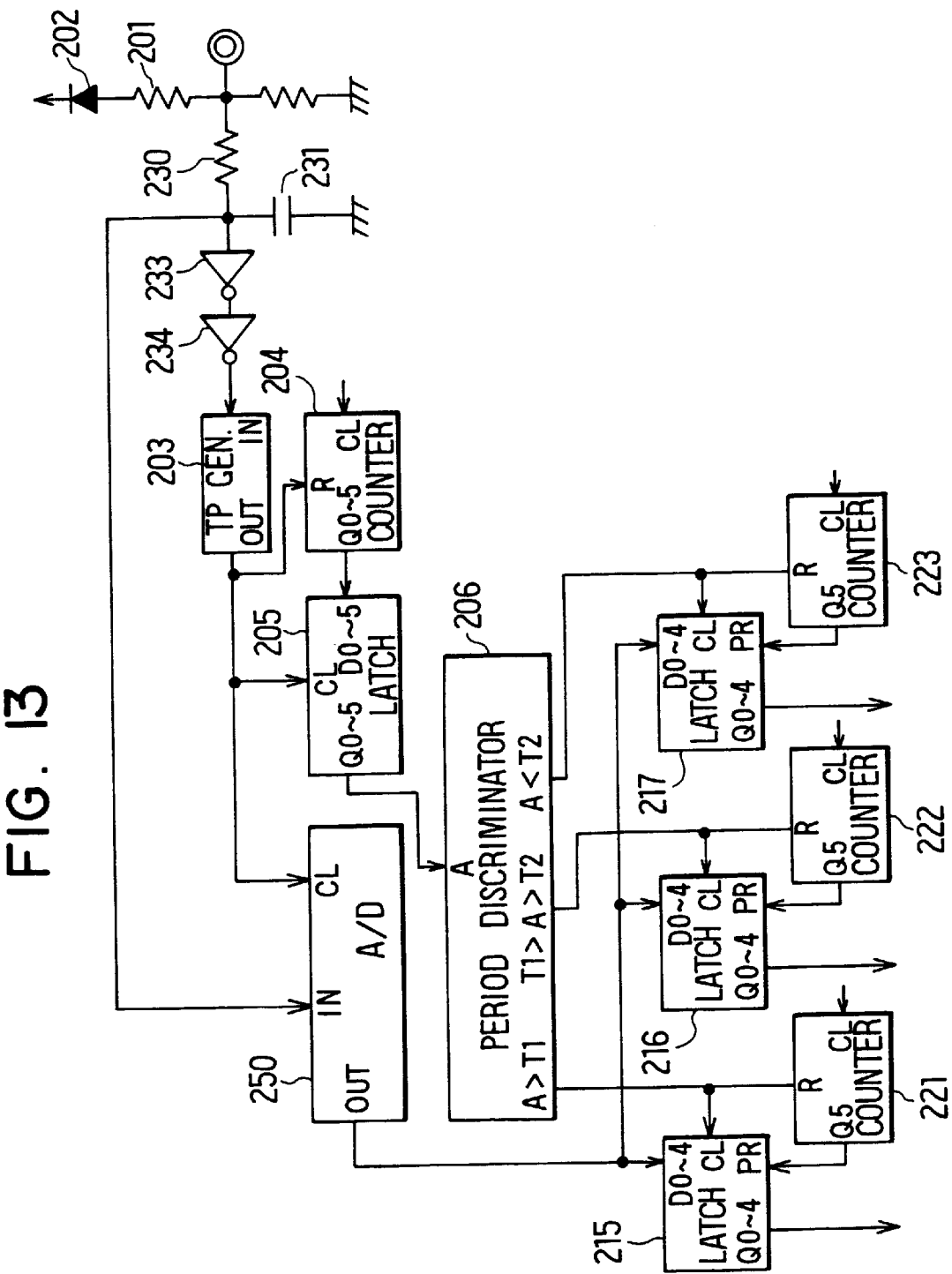
FIG. 13 is a detailed wiring diagram showing the circuit configuration of the external signal receiver circuit in a fourth embodiment of the present invention.

In this embodiment as shown in FIG. 13, the control variables is set based on the peak values of the respective control signals in place of the duty ratios of the control signals. That is, an analog-digital converter 250 is provided in place of the counter 210, latch 211, divider 212, AND gates 207, 208, 209 and duty ratio discriminator 240 used in the first embodiment (FIG. 4). This arrangement is advantageous in reducing the size of the circuit configuration.

The above embodiments, in which the control signals are applied from the ECU 5 to the regulator 1, may be modified in various ways. For instance, the regulator 1 may be designed so that it applies to the ECU 5 and other devices a plurality of control signals which have respective periods or respective peak values. In this instance, those control signals may include a duty signal, excitation current signal, alternator speed signal, stator phase-voltage signal, regulator/alternator failure signal and the like.

The present invention should not be limited to the disclosed embodiments and modifications, but may be implemented in other ways without departing from the spirit of the invention.

What is claimed is:

1. An apparatus for a vehicle having an electric power generator, said apparatus comprising:
    period detecting means for receiving a plurality of signal pulses and detecting a period of each among the plurality of signal pulses;
    signal discriminating means for discriminating a signal type of each among the plurality of signal pulses, said discriminating being based at least in part on the detected period of the corresponding signal pulse;
    signal parameter detecting means for detecting a signal parameter of each among the plurality of signal pulses; and setting means for setting values of each among a plurality of control variables, said setting being based on the discriminated signal type and the detected signal parameter of a corresponding one among the plurality of signal pulses;

wherein a power generation operation of the electric power generator is based at least in part on the value of at least one among said plurality of control variables.

2. The apparatus of claim 1, further comprising:

duty ratio discriminating means for discriminating whether a duty ratio of each among the plurality of signal pulses is within a corresponding predetermined range; and disabling means for preventing the setting means from setting a control variable corresponding to a signal pulse having a duty ratio determined to be outside of the corresponding predetermined range.

3. The apparatus of claim 2, wherein the signal parameter is at least one among a duty ratio and a peak level.

4. The apparatus of claim 1, wherein:

the electric power generator is an alternator which generates electric power when excited; and wherein the plurality of signal pulses are applied to the period detecting means from an external circuit serially through a single signal line.

5. The apparatus of claim 4, wherein:

the plurality of control variables includes a target voltage to be generated by the alternator.

6. The apparatus of claim 4, wherein:

the plurality of control variables includes an upper limit of a conduction ratio of a switching element which supplies an excitation current to the alternator.

7. The apparatus of claim 4, wherein:

the plurality of control variables includes an upper limit of a rate of increase in a conduction ratio of a switching element which supplies an excitation current to the alternator.

8. The apparatus of claim 4, wherein:

the plurality of signal pulses are applied in a predetermined order periodically.

9. The apparatus of claim 4, wherein the signal parameter is at least one among a duty ratio and a peak level.

10. The apparatus of claim 1, wherein the signal parameter is at least one among a duty ratio and a peak level.

11. The apparatus of claim 1, wherein the signal parameter is at least one among a duty ratio and a peak level, and wherein the plurality of control variables includes at least one among a target voltage to be generated by the alternator, an upper limit of a conduction ratio of a switching element which supplies an excitation current to the alternator, and an upper limit of a rate of increase in the conduction ratio.

12. An electric power generation control method for a vehicle having:

an alternator for generating electric power, a regulator for controlling a power generation operation of the alternator, an engine control unit for controlling an operation of an engine, and a signal line connecting the regulator and the engine control unit, said method comprising:

applying a signal pulse from the engine control unit to the regulator serially through the signal line;

detecting by the regulator a period of the signal pulse to indicate a control variable;

detecting by the regulator a parameter of the signal pulse to determine a control value of the indicated control variable; and controlling the indicated control variable of the alternator by the determined control value.

13. The method of claim 12, wherein:

the parameter includes at least one among a duty ratio and a peak level of the signal pulse.

14. The method of claim 13, wherein:

the parameter is variable with an engine operation condition.

15. The method of claim 14, said method further comprising:

applying at least one additional signal pulse from the engine control unit to the regulator serially through the signal line; and detecting by the regulator a period of each among the at least one additional signal pulse to indicate at least one additional control variable, wherein a plurality of control variables comprises the control variable and the at least one additional control variable, the plurality of control variables including at least two among a target voltage to be generated by the alternator, an upper limit of conduction ratio of a switching device for supplying excitation current to the alternator, and a gradual excitation period.

16. The method of claim 12, wherein the parameter is at least one among a duty ratio and a peak level.

17. An apparatus for a vehicle having an electric power generator, said apparatus comprising:

period detecting means for receiving a plurality of signal pulses and detecting a period of each among the plurality of signal pulses;

signal discriminating means for discriminating a signal type of each among the plurality of signal pulses, said discriminating being based at least in part on the detected period of the corresponding signal pulse;

signal parameter detecting means for detecting a signal parameter of each among the plurality of signal pulses; and setting means for setting values of each among a plurality of control variables, said setting being based on the discriminated signal type and the detected signal parameter of a corresponding one among the plurality of signal pulses;

signal receiving discriminating means for discriminating whether a signal pulse is received by the period detecting means within a specified interval; and default means for setting a value of one among said plurality of control variables to a predetermined default value, said default means being operable when the signal receiving discriminating means determines that no signal pulse was received within an interval corresponding to the control variable;

wherein a power generation operation of the electric power generator is based at least in part on a value of at least one among the plurality of control variables.

18. The apparatus of claim 17, wherein:

the plurality of signal pulses are applied in a predetermined order periodically; and the predetermined period for changing the control variables to the default values is set to be longer than a repetition period of the pulse signals.

19. An apparatus for a vehicle having an electric power generator, said apparatus comprising:

period detecting means for receiving a plurality of signal pulses and detecting a period of each among the plurality of signal pulses;

signal discriminating means for discriminating a signal type of each among the plurality of signal pulses, said discriminating being based at least in part on the detected period of the corresponding signal pulse;

signal parameter detecting means for detecting a signal parameter of each among the plurality of signal pulses; and setting means for setting values of each among a plurality of control variables, said setting being based on the discriminated signal type and the detected signal parameter of a corresponding one among the plurality of signal pulses, wherein the electric power generator is an alternator which generates electric power when excited, and wherein the period detecting means receives the plurality of signal pulses from an external circuit serially through a single signal line, and wherein the plurality of control variables includes an upper limit of a conduction ratio of a switching element which supplies an excitation current to the alternator, and wherein an upper limit of a rate of increase in the conduction ratio is set to a predetermined default value when no signal pulse is received within an interval corresponding to the upper limit of the conduction ratio, and wherein the upper limit of the rate of increase in the conduction ratio is set to one among (A) a value higher than the predetermined default value and (B) a non-limiting value when a signal pulse is received within the interval corresponding to the upper limit of the conduction ratio.

20. A method for controlling electric power generation for a vehicle, said vehicle having:

an alternator for generating electric power;

a regulator for controlling a power generation operation of the alternator;

an engine control unit for controlling an operation of an engine; and a signal line connecting the regulator and the engine control unit, said method comprising the steps of:

applying a plurality of signal pulses from the engine control unit to the regulator serially through the signal line, each among the plurality of signal pulses having (A) a period corresponding to a control variable of the alternator and (B) a parameter indicative of a control value of the corresponding control variable;

detecting by the regulator a period of each among the plurality of signal pulses to indicate the corresponding control variable;

detecting by the regulator a parameter of each among the plurality of signal pulses to determine the control value of the corresponding control variable;

controlling at least one among the control variables of the alternator by the corresponding control value;

discriminating whether a signal pulse is received by the regulator within a specified interval; and setting a value of one among the control variables to a predetermined default value when no signal pulse is received within an interval corresponding to the control variable, wherein each parameter includes at least one among a duty ratio and a peak level of the signal pulse, and wherein each parameter is variable with a corresponding operating condition of the engine, and wherein the control variables include at least two among a target voltage to be generated by the alternator, an upper limit of conduction ratio of a switching device for supplying excitation current to the alternator, and a gradual excitation period.

* * * * *